United States Patent
Kupratis et al.

(10) Patent No.: US 10,907,540 B2
(45) Date of Patent: Feb. 2, 2021

(54) INDEPENDENTLY CONTROLLABLE WHEEL FOR A TURBINE SECTION OF A GAS TURBINE ENGINE

(71) Applicant: United Technologies Corporation, Farmington, CT (US)

(72) Inventors: Daniel Bernard Kupratis, Wallingford, CT (US); Jacob Shubinski, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 45 days.

(21) Appl. No.: 16/299,430

(22) Filed: Mar. 12, 2019

(65) Prior Publication Data

US 2020/0291784 A1 Sep. 17, 2020

(51) Int. Cl.
| | |
|---|---|
| *F02C 3/113* | (2006.01) |
| *F01D 9/04* | (2006.01) |
| *F02C 7/36* | (2006.01) |
| *F01D 5/02* | (2006.01) |

(52) U.S. Cl.
CPC .............. *F02C 3/113* (2013.01); *F01D 5/02* (2013.01); *F01D 9/041* (2013.01); *F02C 7/36* (2013.01); *F05D 2220/3212* (2013.01); *F05D 2240/301* (2013.01); *F05D 2260/14* (2013.01); *F05D 2260/97* (2013.01); *F05D 2270/112* (2013.01); *F05D 2270/114* (2013.01); *F05D 2300/505* (2013.01)

(58) Field of Classification Search
CPC ...................................................... F01D 9/041
USPC ........................................................ 416/124
See application file for complete search history.

(56) References Cited

U.S. PATENT DOCUMENTS

| | | | | |
|---|---|---|---|---|
| 4,643,636 A | * | 2/1987 | Libertini ................. | F01D 5/284 415/138 |
| 6,981,841 B2 | * | 1/2006 | Krammer ................ | F01D 5/082 415/115 |
| 7,140,832 B2 | * | 11/2006 | Jacks ....................... | F01D 9/041 415/1 |

(Continued)

FOREIGN PATENT DOCUMENTS

| | | |
|---|---|---|
| EP | 1533473 A1 | 5/2005 |
| EP | 3163020 A1 | 5/2017 |

(Continued)

OTHER PUBLICATIONS

Aerospace Engineering. "Jet Engine Detail Design: The Compressor" Jan. 11, 2013. https://aerospaceengineeringblog.com/jet-engine-compressor/ (Year: 2013).*

(Continued)

*Primary Examiner* — Michael Lebentritt
*Assistant Examiner* — Topaz L. Elliott
(74) *Attorney, Agent, or Firm* — Bachman & LaPointe, P.C.

(57) ABSTRACT

A turbine section for a gas turbine engine includes an independently controllable wheel downstream of the first static vane structure and a turbine rotor downstream of the independently controllable wheel. A method of generating thrust for a gas turbine engine, includes rotating a independently controllable wheel located downstream of a combustor and upstream of a turbine rotor to augment a swirl of a core flow combustion gases.

16 Claims, 8 Drawing Sheets

(56) References Cited

U.S. PATENT DOCUMENTS

| | | | | |
|---|---|---|---|---|
| 8,099,944 B2* | 1/2012 | Foster | ............... | F02C 6/206 |
| | | | | 60/226.1 |
| 8,291,716 B2* | 10/2012 | Foster | ............... | F02C 6/14 |
| | | | | 60/788 |
| 2006/0222482 A1* | 10/2006 | Jacks | ............... | F01D 25/36 |
| | | | | 415/1 |
| 2010/0083632 A1* | 4/2010 | Foster | ............... | B64D 31/06 |
| | | | | 60/39.181 |
| 2016/0084156 A1* | 3/2016 | Martinez-Botas | ...... | F01D 9/041 |
| | | | | 417/364 |
| 2018/0156060 A1* | 6/2018 | Martinez-Botas | ...... | F01D 17/12 |

FOREIGN PATENT DOCUMENTS

| | | | | |
|---|---|---|---|---|
| EP | 3301276 A1 | 4/2018 | | |
| WO | WO-2018051127 A1 * | 3/2018 | ............ | F01D 17/14 |

OTHER PUBLICATIONS

European Search Report dated Jun. 9, 2020 issued for corresponding European Patent Application No. 20162823.7.

* cited by examiner

FIG. 8
(PRIOR ART)
FIG. 9
(PRIOR ART)
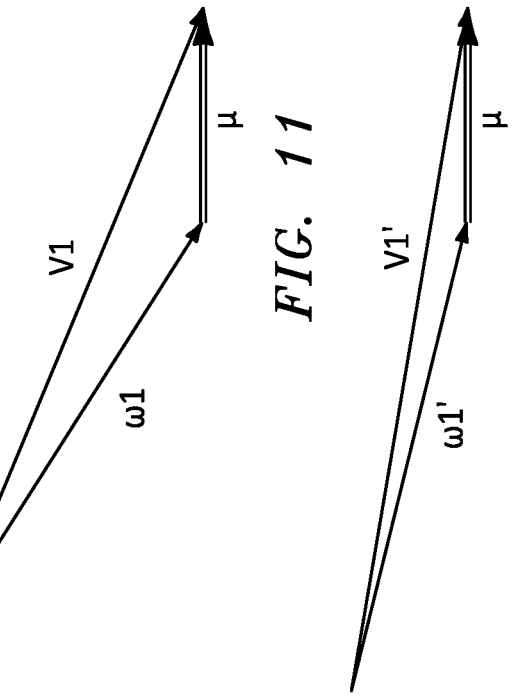
FIG. 11
FIG. 12
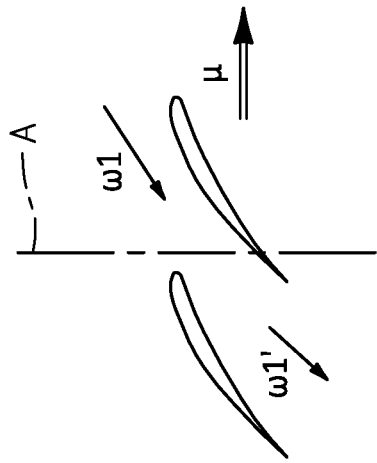
FIG. 7
(PRIOR ART)
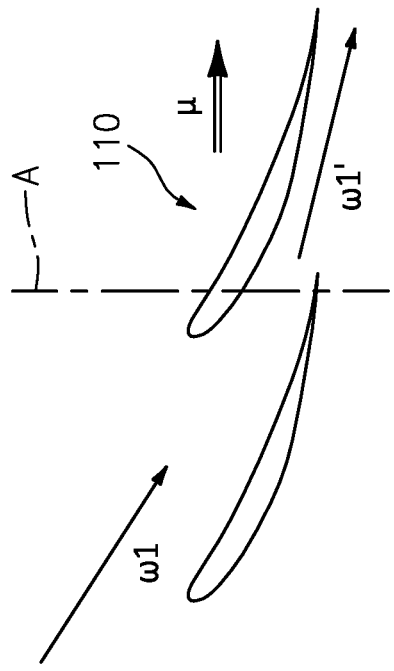
FIG. 10

| Aircraft Mode | Engine Mode | Time Mode | Turbine's Wheel Speed, U ~% Udesign speed | Free Wheel's Wheel Speed, mu ~% mudesign speed | Free Wheel Mode | Comment |
|---|---|---|---|---|---|---|
| On ground | Engine Start | Transient | 0% | (-)100% | Turbine | Power input to Free Wheel. The Free Wheel rotates in direction opposite the direction of U |
| On ground | Engine Start | Transient | 20% | (-)50% | Turbine | U is below engine self sustaining idle speed |
| On ground | Engine Start | Transient | 35% | 0% | Neutral | Engine starter cut-off and power input to Free Wheel is zero |
| On ground | Engine Idle | Steady-state | 40% | 10% | Compressor | Power input to Free Wheel. The Free Wheel rotates in same direction as U. |
| Taxi out | Low power | Steady-state | 60% | 25% | Compressor | |
| Takeoff | Very high power | Steady-state | 100% | 100% | Compressor | |
| Climb | High power | Steady-state | Less than 100% | 100% | Compressor | Free Wheel augments turbine power output |
| Cruise | Moderate Power | Steady-state | >60% | <100% | Compressor | Free Wheel augments turbine power output |
| Descent | Low Power | Steady-state | >60% | 0% | Neutral | Free Wheel windmills and enables turbine to remain at higher speed in anticipation of a demanded increase in engine power |
| Change to slower rate of descent | Initiate Snap Accel | Transient | >60% | (-)50% | Turbine | Free Wheel reduces pressure at combustor outlet and enables increased ramp of fuel flow rate |
| Change to slower rate of descent | End Snap Accel | Transient | Less than 100% | >50% | Compressor | Free Wheel augments turbine power output and enables engine to reach demanded thrust at slower turbine wheel speed, U |
| Change to faster rate of descent | Initiate Snap Decel | Transient | >60% | 50% | Compressor | Free Wheel increases pressure at combustor outlet enables reduced ramp of fuel flow rate |
| Change to faster rate of descent | End Snap Decel | Transient | >40% | >50% | Compressor | Free Wheel augments turbine power output and enables engine to reach demanded thrust at faster turbine wheel speed, U |
| Landing | Lower Power | Steady-state | >60% | 0% | Neutral | Free Wheel windmills and enables turbine to remain at higher speed in anticipation of a demanded increase in engine power |
| Braking | High Power Thrust Reverse | Transient | Less than 100% | 100% | Compressor | Free Wheel augments turbine power output |
| Taxi in | Low power | Steady-state | 60% | 25% | Compressor | |
| At Gate | Cool down | Steady-state | >0% | 100% | Compressor | Engine is "OFF". Zero fuel flow; zero combustion. Free Wheel avoids rotor bowing of high pressure spool by causing turbine to windmill |

*FIG. 23*

INDEPENDENTLY CONTROLLABLE WHEEL FOR A TURBINE SECTION OF A GAS TURBINE ENGINE

BACKGROUND

The present disclosure relates to a gas turbine engine architecture, and more particularly, to a turbine section with an independently controllable wheel stage.

Gas turbine engines, such as those which power modern commercial and military aircraft, include a compressor section to pressurize a supply of air, a combustor section to burn a hydrocarbon fuel in the presence of the pressurized air, and a turbine section to extract energy from the resultant combustion gases and generate thrust. Downstream of the turbine section, a military engine may include an augmentor section, or "afterburner", that is operable to selectively increase the thrust. The increase in thrust is produced when fuel is injected into the core exhaust gases downstream of the turbine section and burned with the oxygen contained therein to generate a second combustion.

Turbine aero design systems often favor low vane exit Mach number (to reduce losses) and high reaction with high turning in the rotor blade cascade and blade higher exit Mach number. The design system also favors higher wheel speed for higher flow velocity and lower aero loading. However, high reaction and high wheel speed may increase blade cooling requirements and increase blade stress.

SUMMARY

A turbine section for a gas turbine engine according to one disclosed non-limiting embodiment of the present disclosure includes a first static vane structure; an independently controllable free wheel downstream of the first static vane structure; and a turbine rotor downstream of the independently controllable wheel.

A further embodiment of any of the foregoing embodiments of the present disclosure includes that the first static vane structure comprises a row of Nozzle Guide Vanes.

A further embodiment of any of the foregoing embodiments of the present disclosure includes that the independently controllable wheel is driven by an electric motor.

A further embodiment of any of the foregoing embodiments of the present disclosure includes that the electric motor is formed by a stator assembly and a rotor assembly.

A further embodiment of any of the foregoing embodiments of the present disclosure includes that the rotor assembly comprises a multiple of free wheel rotor blades.

A further embodiment of any of the foregoing embodiments of the present disclosure includes that the multiple of free wheel rotor blades are uncooled.

A further embodiment of any of the foregoing embodiments of the present disclosure includes that the multiple of free wheel rotor blades are manufactured of a ceramic material.

A further embodiment of any of the foregoing embodiments of the present disclosure includes that the multiple of free wheel rotor blades are thinner in thickness versus chord ratio as compared to a multiple of rotor blades of the turbine rotor assembly.

A further embodiment of any of the foregoing embodiments of the present disclosure includes that the multiple of free wheel rotor blades rotate in the same direction as a multiple of rotor blades of the turbine rotor assembly.

A further embodiment of any of the foregoing embodiments of the present disclosure includes that the multiple of free wheel rotor blades increase a swirl prior to the turbine rotor assembly.

A further embodiment of any of the foregoing embodiments of the present disclosure includes that the multiple of free wheel rotor blades provide a pressure flow lower than a conventional compressor stage.

A further embodiment of any of the foregoing embodiments of the present disclosure includes that the multiple of free wheel rotor blades provide a pressure flow of 1.01-1.02.

A further embodiment of any of the foregoing embodiments of the present disclosure includes a controller to selectively control the speed of the independently controllable wheel independent of the turbine rotor assembly.

A method of generating thrust for a gas turbine engine according to one disclosed non-limiting embodiment of the present disclosure includes rotating an independently controllable wheel located downstream of a combustor and upstream of a turbine rotor to augment a swirl of a core flow combustion gases.

A further embodiment of any of the foregoing embodiments of the present disclosure includes locating the independently controllable wheel downstream of a first static vane structure.

A further embodiment of any of the foregoing embodiments of the present disclosure includes that augmenting the swirl comprises augmenting the swirl angular direction relative to a centerline of the engine to angle the core flow combustion gases closer to the direction of rotation of the turbine rotor.

A further embodiment of any of the foregoing embodiments of the present disclosure includes that rotating the independently controllable wheel comprises electromechanically driving the independently controllable wheel.

A further embodiment of any of the foregoing embodiments of the present disclosure includes that rotating the independently controllable wheel comprises driving the independently controllable wheel independent of the turbine rotor.

A further embodiment of any of the foregoing embodiments of the present disclosure includes that rotating the independently controllable wheel comprises driving the independently controllable wheel independent of the turbine rotor to load match a turbine to a generator load by varying the wheel speed of the independently controllable wheel.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 7 is a schematic illustration of a RELATED ART conventional compressor blades with rotating wheel speed.

FIG. 8 is a schematic illustration of a RELATED ART conventional compressor blade inlet velocity triangle.

FIG. 9 is a schematic illustration of a RELATED ART conventional compressor blade exit velocity triangle.

FIG. 10 is a schematic illustration of the independently controllable wheel compressor blades with rotating wheel speed.

FIG. 11 is a schematic illustration of the independently controllable wheel compressor blade inlet velocity triangle.

FIG. 12 is a schematic illustration of the independently controllable wheel compressor blade exit velocity triangle.

FIG. 23 is a chart of the independently controllable wheel turbine in operation.

DETAILED DESCRIPTION

Figure 1:
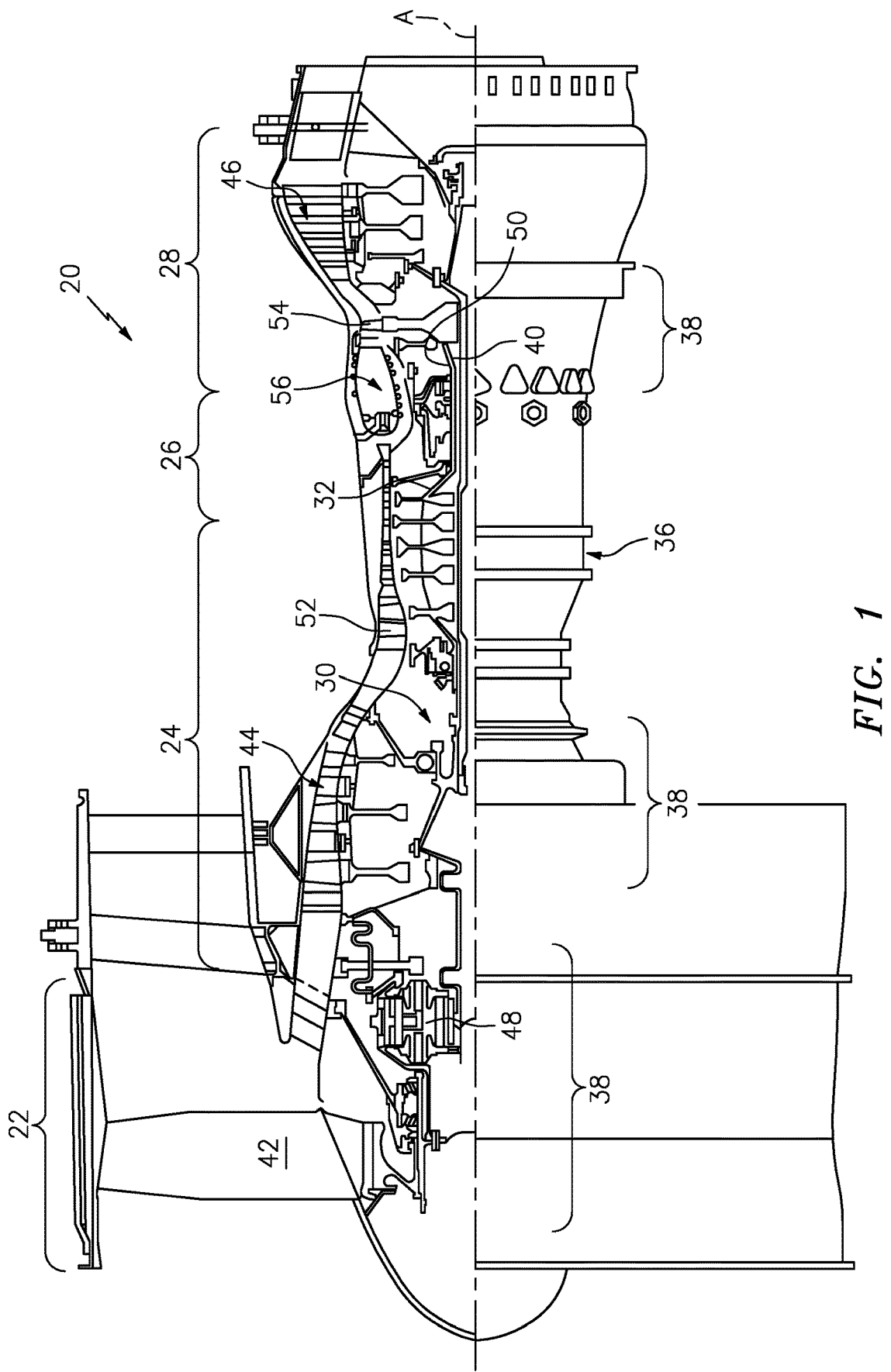
FIG. 1 is a schematic cross-section of an example gas turbine engine architecture.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. The fan section 22 drives air along a bypass flowpath while the compressor section 24 drives air along a core flow combustion gas path for compression and communication into the combustor section 26, then expansion through the turbine section 28. The fan, compressor, and turbine sections may include various architectures that, for example, include a multitude of stages, each with or without various combinations of variable or fixed guide vanes. The sections are defined along a central longitudinal engine axis A.

Although depicted as a turbofan in the disclosed non-limiting embodiment, it should be appreciated that the concepts described herein may be applied to other engine architectures such as turbojets, turboshafts, and three-spool (plus fan) turbofans.

The engine 20 generally includes a low spool 30 and a high spool 32 mounted for rotation about an engine central longitudinal axis A relative to an engine static structure 36 via several bearings 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 that drives the fan 42 at a lower speed than the low spool 30. An exemplary reduction transmission is an epicyclic transmission, such as a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44, then the HPC 52, mixed with the fuel and burned in the combustor 56, then expanded over the HPT 54 and the LPT 46 which rotationally drive the respective high spool 32 and the low spool 30 in response to the expansion. The main engine shafts 40, 50 are supported at a plurality of points by bearings 38 within the static structure 36.

Figure 2:
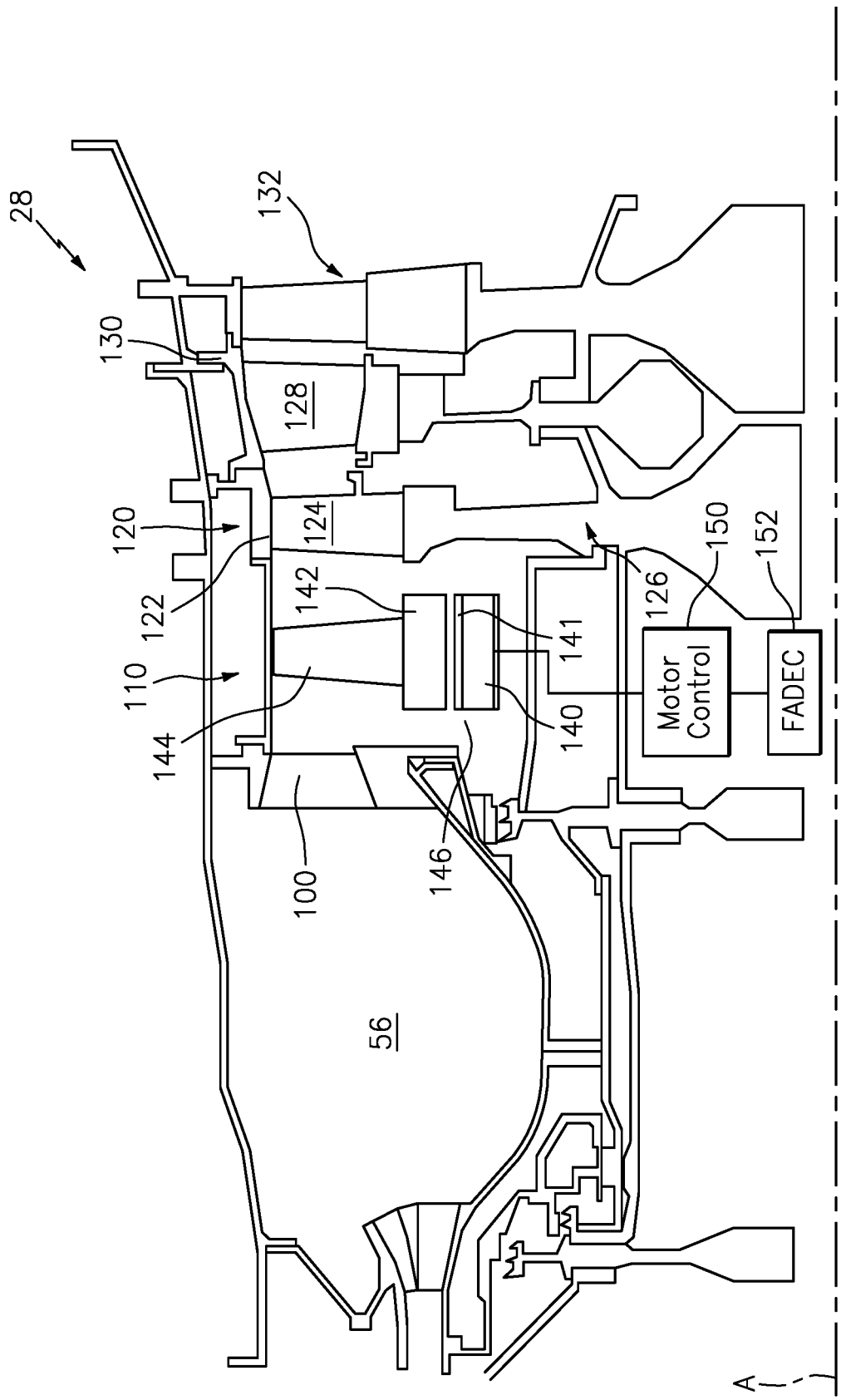
FIG. 2 is a schematic illustration of a turbine section of the gas turbine engine with the driven independently controllable wheel according to one disclosed non-limiting embodiment.

With reference to FIG. 2, the turbine section 28 includes a row of Nozzle Guide Vanes (NGVs) 100 located immediately downstream of the combustor 56 as the first static vane structure upstream of the turbine section 28. The NGVs 100 are static airfoils that direct the core flow combustion gases from the combustor 56 to facilitate the conversion of pressure energy into kinetic energy. The combustion gases are also accelerated by the NGVs 100 because of their convergent shape and typically provide a "spin" or a "swirl" in the direction of turbine rotor rotation.

An independently controllable wheel 110 is positioned immediately downstream of the NGVs 100. Downstream of the independently controllable wheel 110 is a turbine rotor 126. The turbine rotor 126 includes a shroud assembly 120 within the engine case structure 36 that supports a blade outer air seal (BOAS) assembly 122 proximate to a multiple of rotor blades 124 of the turbine rotor 126. Downstream of the turbine rotor 126, an array of vanes 128 that form a vane ring 130 completes the stage. One or more additional turbine rotor stages 132 (one shown) may be located downstream thereof in the turbine section 28. Various turbine section architectures may alternatively or additionally be provided inclusive of various combinations of variable or fixed guide vanes. The stator vanes align the core flow combustion gases while the rotor blades collect the energy of the working medium gases and drive the turbine rotors which in turn drives the compressor.

The independently controllable wheel 110 is selectively driven to increase energy into the core flow combustion gases from the upstream NGVs 100. The independently controllable wheel 110 turbomachinery is essentially a relatively weak compressor with a flow pressure ratio of 1.01-1.02 which is lower than a conventional compressor stage (e.g., 1.2-1.3). The compression is not quite desirable but the change in swirl from less swirl to more swirl by applying energy to the flow generates some compression.

The independently controllable wheel 110 increases swirl as the independently controllable wheel 110 is rotationally driven at about 40%-60% of the downstream turbine rotor 126 speed. The swirl is of a velocity that is nearly tangential relative to the axis of rotation A and is basically pushing the core flow combustion gases in the same direction as the downstream turbine rotor 126 to augment the swirl from the upstream NGVs 100.

The independently controllable wheel 110 generally includes a stator 140, and a rotor 142 with a multiple of free wheel rotor blades 144. The independently controllable wheel 110 is freewheeling in the sense that it may rotate independent of the high pressure turbine and can be selectively controlled, i.e., is infinitely variable with respect to the downstream turbine rotor 126. In one embodiment, the stator 140 and the rotor 142 form an electric motor 146 to selectively drive the multiple of free wheel rotor blades 144 in response to a controller 150. That is, the stator 140 may include an electromagnet 141 such that the rotor 142 is subject to the magnetic field created by the stator 140 to drive the rotor 142. In another embodiment, the independently controllable wheel 110 may be driven by high pressure bleed flow in response to the controller 150. The multiple of free wheel rotor blades 144 may be manufactured of a ceramic material or metallic alloy and may be uncooled. As a weak compressor, the airfoil shapes of the free wheel rotor blades 144 of the independently controllable wheel 110 are comparable as the airfoil shapes at the tips of the blades of a conventional compressor and are thin in an airfoil shape thickness dimension (t) relative to airfoil chord length dimension (b) and are lower in airfoil camber for compatibility with higher flow Mach numbers and lower aerodynamic losses. The t:b ratio is less than about 15%. The camber of the airfoil shapes is substantially less than the camber of the upstream NGVs 100. The stagger of the rotor blades 144 is substantially tangent to the engine centerline axis A and the stagger of the upstream NGVs 100 is relatively less tangent to the engine centerline axis A. The metallic alloy rotor blades 144 can be shape memory alloys that change the camber of the airfoil shapes in response to changes in the electric current of the rotor 142 of the electric motor 146. Moderate changes to the camber of the airfoil shapes of the rotor blades 144 with free wheel speed further vary the effect of the free wheel swirl and improve the aerodynamic efficiency of the free wheel rotor 142 and the turbine rotor 126. The changes in airfoil camber can be scheduled as a function of free wheel speed.

The controller 150 generally includes a processor, a memory, and an interface. The processor may be any type of known microprocessor having desired performance characteristics. The memory may be any computer readable medium which stores data and control algorithms such as logic as described herein. The controller 150 may, for example, be a portion of a flight control computer, a portion of a Full Authority Digital Engine Control (FADEC) 152, a stand-alone unit or combinations thereof.

Figure 3:
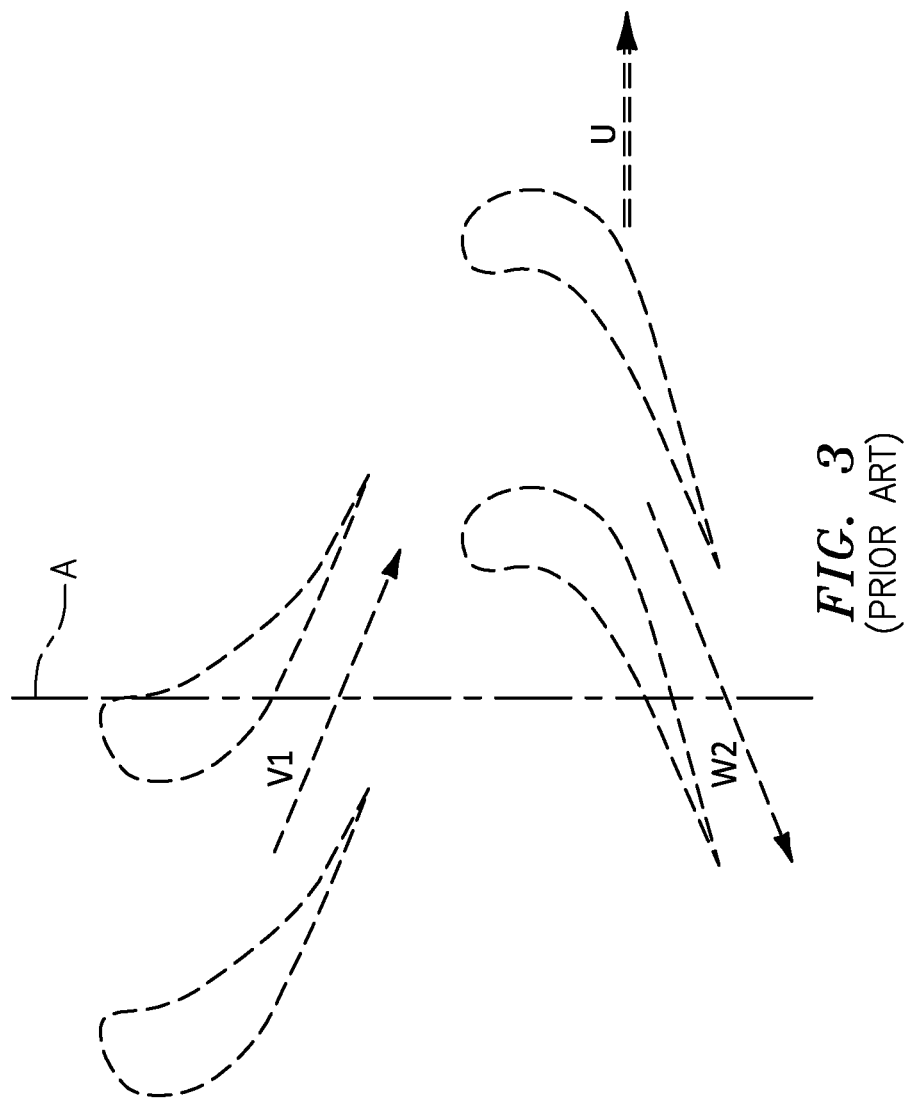
FIG. 3 is a schematic illustration of a RELATED ART conventional turbine stage comprising stationary vanes and rotating blades with wheel speed.

With reference to FIG. 3, a conventional turbine stage includes a forward cascade of stationary vanes, and an aft cascade of rotating blades that rotate about the engine centerline axis A with wheel speed, U. The flow exiting the cascade of stationary vanes enters the cascade of rotating blades. The core flow combustion gases exiting the cascade of stationary vanes has an absolute velocity, V1, directed aftward toward the cascade of rotating blades and in a direction generally comparable to the cascade of rotating blades. The flow enters the cascade of rotating blades and changes direction within the cascade, exiting at a velocity, W2, relative to the cascade of rotating blades. The conventional turbine stage characteristically has the relative velocity, W2, and the absolute velocity, V1, measured in feet/sec or meters/sec. The velocity, V1, is the velocity of the core flow combustion gases exiting the cascade of stationary vanes. Because the vanes are stationary, the velocity of the core flow combustion gases relative to the cascade of stationary vanes is the same as the absolute velocity of the core flow combustion gases exiting the cascade of stationary vanes.

The cascade of rotating blades rotates about the central longitudinal engine axis A with wheel speed, U. The velocity, W2, is the velocity of the core flow combustion gases exiting the cascade of rotating blades. Because the blades are rotating, the velocity of the core flow combustion gases relative to the blades is not the same as the absolute velocity of the core flow combustion gases passing through the exit of the cascade of rotating blades.

Figure 4:
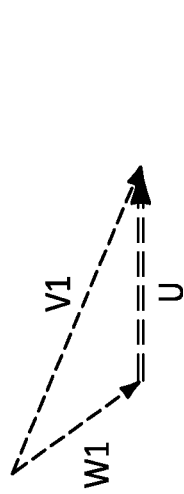
FIG. 4 is a schematic illustration of a RELATED ART conventional turbine stage blade inlet velocity triangle.
Figure 5:
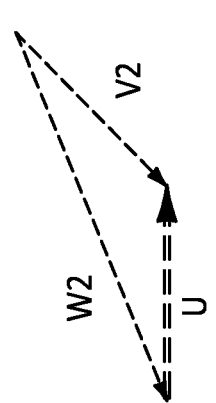
FIG. 5 is a schematic illustration of a RELATED ART conventional turbine stage blade exit velocity triangle.

With reference to FIGS. 4 and 5, a thermodynamic-aerodynamic analysis of the turbine is describable via the construction of velocity triangles wherein the base of the triangle is the wheel speed, U, of the cascade of rotating blades. A velocity triangle for the inlet of the cascade of rotating blades is shown in FIG. 4 and a velocity triangle for the exit of the cascade of rotating blades is shown in FIG. 5. For simplicity, the wheel speeds at the inlet and exit of the cascade of rotating blades is assumed to be the same, that is $U1=U2=U$. FIG. 4 represents the velocity triangle for thermo-aerodynamic analysis of the core flow combustion gases exiting the cascade of stationary vanes, relative to the cascade of rotating blades. For the inlet of the cascade of rotating blades, the velocity, V1, of the core flow combustion gases passing through the exit of the cascade of stationary vanes, is one leg of the triangle. Because the blades are moving with wheel speed, U, the cascade of rotating blades see the core flow combustion gases entering as a relative velocity, W1. The velocity of the core flow combustion gases exiting the stationary vanes but relative to the cascade of rotating blades is W1.

Within the reference frame of the cascade of rotating blades, the core flow combustion gases enter the cascade of rotating blades at the relative speed W1. The flow enters the cascade of rotating blades in a swirling angular direction relative to the central longitudinal engine axis A and has a vector component in the same direction as the cascade of rotating blades. In other words, the core flow combustion gases with velocity W1 points partway in the same direction as the wheel speed U and the core flow combustion gases also points partway in the aft direction and parallel to the central longitudinal engine axis A. The velocity, V1, is the longer leg of the velocity triangle compared to the relative velocity, W1.

For the exit of the cascade of rotating blades (FIG. 5), the relative velocity, W2, of the core flow combustion gases passing through the exit of the cascade of rotating blades is one leg of the triangle. The absolute velocity, V2, of the core flow combustion gases passing through the exit of the cascade of rotating blades is the other leg of the triangle.

Within the core flow combustion gases channel constructed by the cascade of rotating blades, the core flow combustion gases turn in a swirling angular direction relative to the central longitudinal engine axis A, away from the direction of the wheel speed, U, and accelerate to a relative velocity, W2. Relative to the cascade of rotating blades, the core flow combustion gases exit the cascade of rotating blades in a swirl angular direction relative to the central longitudinal engine axis A and have a vector component in the opposite direction as the wheel speed of the cascade of rotating blades. In other words, the core flow combustion gases with velocity W2 point partway in the opposite direction as the wheel speed, U, and the core flow combustion gases also point partway in the aft direction and parallel to the central longitudinal engine axis A.

Figure 6:
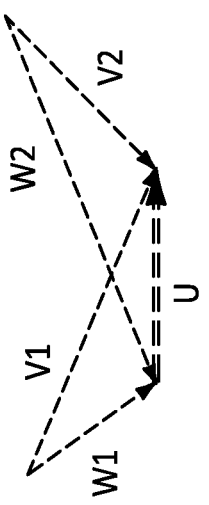
FIG. 6 is a schematic illustration of a RELATED ART conventional turbine stage overlay of blade inlet and exit velocity triangles that shows ~50% reaction design.

The acceleration of the core flow combustion gases through the cascade of rotating blades increases the relative velocity, W2, greater than that the absolute velocity, V2, of the core flow combustion gases passing through the exit of the cascade of rotating blades. The relative velocity, W2, is the longer leg of the velocity triangle compared to the absolute velocity, V2 (FIG. 6). Per the assumption that the wheel speed, U, is the same at the inlet and exit of the cascade of rotating blades, the velocity triangles (FIGS. 4 and 5) can be overlayed to compare the velocities. The magnitudes of the inlet absolute velocity vector, V1 and the exit relative velocity vector, W2, are similar. This similarity is typical of an approximately 50% reaction turbine. A 50% reaction turbine has the shape of the turbine stage blade inlet velocity triangle and the shape of the turbine stage blade exit velocity triangle are substantially mirror images about the central longitudinal engine axis A. The corresponding flow relative velocity, W2, and the absolute velocity, V1, are similar in speed measured in feet/sec or meters/sec. The corresponding flow relative velocity, W1, and the absolute velocity, V2, are similar in speed measured in feet/sec or meters/sec. The energy extracted by the turbine rotor blades 124 of the turbine rotor 126 is obtained by a summed change of static pressure of the core flow gases plus the change of the dynamic pressure of the core flow gases. The change in dynamic pressure of the core flow gases is due to the change in kinetic energy of the core flow gases corresponding with the square of the absolute velocity, V2, versus the square of the absolute velocity, V1.

The reaction, R, is defined as ratio of the energy extracted by the turbine by means of the change of static pressure of the core flow gases (numerator) to the total energy extracted (denominator) as the summed change of static pressure of the core flow gases plus the change of the dynamic pressure of the core flow gases. Larger changes in static pressure increase flow Mach numbers and increase aerodynamic losses in the turbine. The independently controllable wheel 110 increases the change in dynamic pressure of the core flow gases and increases the change in kinetic energy of the core flow gases corresponding with the square of the absolute velocity, V2, versus the square of the absolute velocity, V1, and reduces the change of static pressure of the core flow gases within cascade of rotating blades 144. This reduces the numerator faster than the denominator and allows the reaction, R, to be less than 50% for a substantially similar extraction of energy from the core flow gases. Reducing the change of static pressure of the core flow gases results in a lower the exit relative velocity vector, W2, relative to a conventional turbine. A lower the exit relative velocity vector, W2, than a conventional turbine results in a lower Mach number, Mw2, and decreases the aerodynamic pressure losses within the core flow combustion gases, and increases the thermodynamic efficiency of the turbine section.

The corresponding flow Mach numbers, Mv1 and Mw2 of the respective velocity vectors, V1 and W2 are similar. A high-level Mach number, Mw2, may be sonic (Mach number is about one) or supersonic (Mach number is substantially greater than one). The high-level Mach number increases the aerodynamic pressure losses within the core flow combustion gases and reduces the thermodynamic efficiency of the turbine section 28. The size of the triangles as a measure of the speed of the core flow combustion gases exiting the cascade of stationary vanes and passing through the cascade of rotating blades is an attribute caused by the cascade of rotating blades wheel speed U. An increase to the wheel speed U, increases the work output of the turbine section 28, increases Mach number, Mw2, increases the aerodynamic pressure losses within the core flow combustion gases, and reduces the thermodynamic efficiency of the turbine section.

With reference to FIG. 7, a conventional compressor cascade of rotating blades rotating about the central longitudinal engine axis A is schematically illustrated. The compressor cascade of rotating blades wheel speed is shown at μ. The flow enters the cascade of rotating blades with a relative velocity ω1 and exits with a relative velocity ω1'. The flow enters with relative velocity ω1 and points partway in the opposite direction as the wheel speed μ and the core flow combustion gases exits with relative velocity ω1' and points partway in the opposite direction as the wheel speed μ.

FIG. 8 represents the inlet velocity triangle for the conventional compressor cascade of rotating blades. FIG. 9 represents the exit velocity triangle for the conventional compressor cascade of rotating blades. The flow enters with absolute velocity V1 and points partway in the same direction as the wheel speed μ and the core flow combustion gases exits with absolute velocity V1' and points partway in the same direction as the wheel speed μ. The cascade of rotating blades increases the swirl of the core flow combustion gases. In other words, the core flow combustion gases exit the cascade of rotating blades in a swirl angular direction relative to the central longitudinal engine axis A that is angled more closely to the direction of the wheel speed, μ.

FIG. 10 represents the independently controllable wheel 110 cascade of rotating blades rotating about the central longitudinal engine axis A. The independently controllable wheel 110 cascade wheel speed is mu. The flow enters the independently controllable wheel 110 cascade of rotating blades with a relative velocity ω1 and exits with a relative velocity ω1'. The flow enters with relative velocity ω1 and points partway in the same direction as the wheel speed mu and the core flow combustion gases exits with relative velocity ω1' and points partway in the same direction as the wheel speed mu. Referring briefly to FIG. 2 the span length and radial location of the free wheel blades 144 is substantially the same as the span length and radial location of the NGVs 100 measured radially with respect to the central longitudinal engine axis A. The span and stagger of the free wheel 110 cascade of rotating blades defines an annular cross-sectional flowpath and flow channel for the core flow combustion gases. Referring again to FIG. 10 the stagger of the airfoils 144 of the independently controllable wheel 110 is more tangential to the central longitudinal engine axis A than the stagger of the stationary vanes NGVs 100 of the turbine shown in FIG. 3. The rotating free wheel blades 144 create an effectively more tangential stagger than the NGVs 100 alone and increase the tangential swirl entering the rotor blades 124 of the variable reaction turbine. The swirl enhancement of the rotating free wheel 110 cascade can enable a decreased tangential stagger of the NGVs 100 and decreased swirl imparted by the NGVs 100 while increasing the swirl into the rotor blades 124. The cooled NGVs 100 are limited by manufacturing technologies including casting processes to stagger angles that are less tangential than the blades 144 of the free wheel 110.

FIG. 11 represents the inlet velocity triangle for the independently controllable wheel 110. FIG. 12 represents the exit velocity triangle for the independently controllable wheel 110. The flow enters with absolute velocity V1 and points partway in the same direction as the wheel speed mu and the core flow combustion gases exit with absolute velocity V1' and V1' points partway in the same direction as the wheel speed mu. The independently controllable wheel 110 accelerates the relative velocity of the core flow combustion gases from an entering value of $\omega 1$ to an exit value of $\omega 1'$. The free wheel enables a redistribution of a portion of the change of static pressure of the core flow gases from within the rotor 124 to the free wheel 110. The free wheel enables a lower static pressure and lower static temperature, Ts1', of the core flow gases prior to entering the turbine blades 124.

The wheel speed, Mu, of the independently controllable wheel 110 is substantially lower than the wheel speed, U, of the turbine rotor 126 (FIG. 2). The independently controllable wheel 110 accelerates the core flow combustion gases both in the absolute and relative rotating frames of reference. The shape of the rotor blades 144 (FIG. 2) of the independently controllable wheel 110, in one embodiment as in FIG. 10, may be similar to the shape of the airfoils of the compressor shown in FIG. 7 and are mirror imaged in stagger relative to the central longitudinal engine axis A. In another words the airfoils of FIG. 7 and FIG. 10 are mirror images in stagger but the same in direction of rotation about the central longitudinal engine axis A. The rotor blades 144 of the independently controllable wheel 110 may be relatively thinner in thickness versus chord ratio (t:b) to be suited to a higher inlet flow velocity, V1, and concurrent higher inlet flow Mach number M$\omega$ than the NGVs 100. In one embodiment, the t:b of the free wheel 110 airfoils is less than one-half the t:b of the NGVs 100. In another embodiment the t:b of the free wheel 110 airfoils is less than one-quarter the t:b of the NGVs 100. In another embodiment, the t:b of the free wheel 110 airfoils is less than one-eighth the t:b of the NGVs 100 t:b.

The independently controllable wheel 110 increases the absolute velocity of the core flow combustion gases entering from a level of V1 to a higher exit absolute velocity, V1'. The independently controllable wheel 110 increases the swirl of the core flow combustion gases. In other words, the core flow combustion gases exit the independently controllable wheel 110 (FIG. 12) in an angular direction (or swirl) relative to the central longitudinal engine axis A that is angled closer to the direction of the wheel speed, mu.

Figure 13:
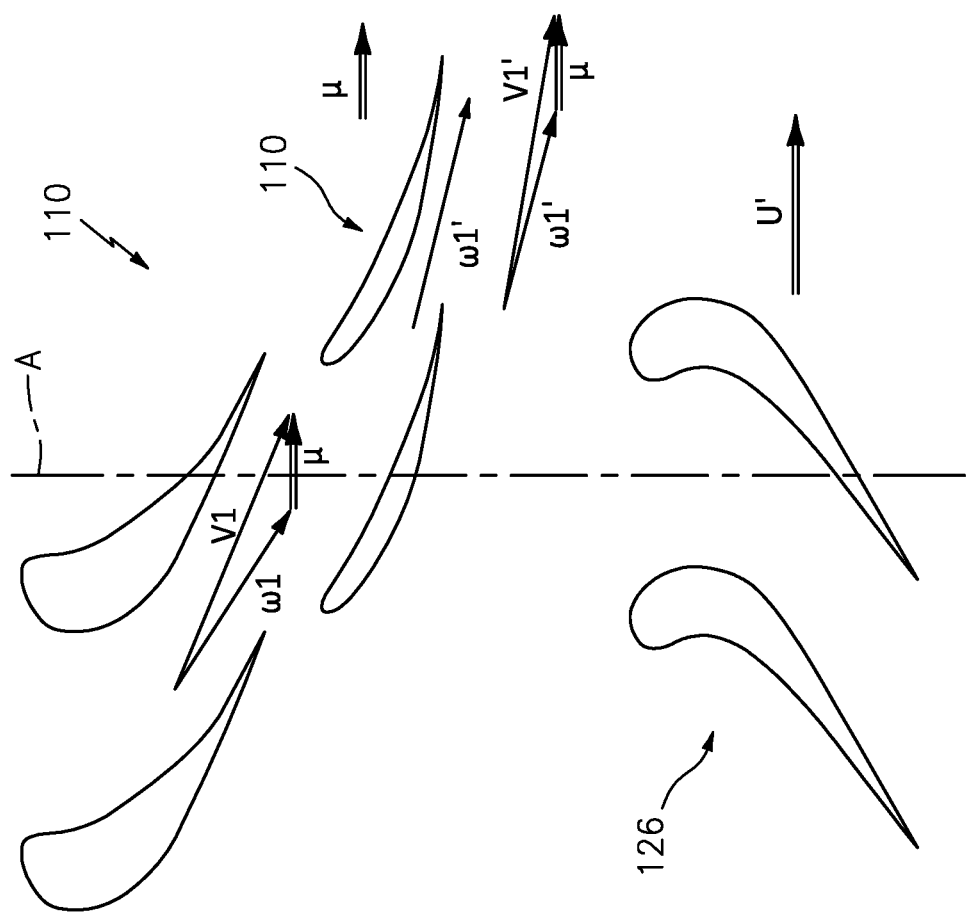
FIG. 13 is a schematic illustration of independently controllable wheel turbine stage comprising stationary vanes, independently controllable wheel compressor, and rotating blades.

With reference to FIG. 13 the independently controllable wheel 110 rotating with wheel speed mu is located aft of the NGVs 100 and forward of the turbine rotor 126 rotating with wheel speed, U'. The independently controllable wheel 110 augments the velocity, V1, exiting the NGVs 100 to a higher velocity, V1', and augments the swirl angular direction relative to the central longitudinal engine axis A that is angled closer to the direction of rotation of the turbine rotor 126. Swirling the inlet flow to the turbine rotor 126 to approach ever closer to the same direction as the direction of rotation of the turbine rotor 126 increases the efficiency of the turbine and enables a reduction in the wheel speed, U', to a value smaller than the wheel speed, U, of a conventional turbine while achieving the same work output as a conventional turbine.

Figure 14:
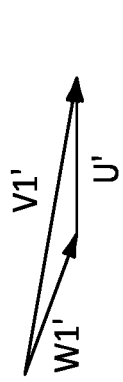
FIG. 14 is a schematic illustration of the independently controllable wheel turbine stage blade inlet velocity triangle.
Figure 15:
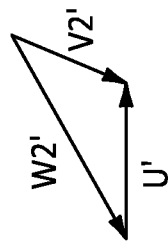
FIG. 15 is a schematic illustration of the independently controllable wheel turbine stage blade exit velocity triangle.
Figure 16:
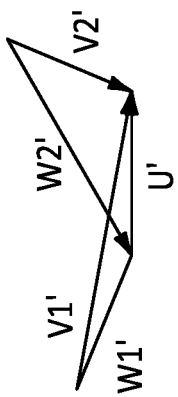
FIG. 16 is a schematic illustration of the independently controllable wheel turbine stage overlay of blade inlet and exit velocity triangles shows lower (<<50%) reaction design.

FIG. 14 represents the velocity triangle for the inlet of the rotating blades of a turbine incorporating the independently controllable wheel 110. FIG. 15 represents the velocity triangle for the exit of the rotating blades of a turbine incorporating the independently controllable wheel 110. For simplicity, the wheel speeds at the inlet and exit of the cascade of rotating blades is assumed to be the same, that is U1'=U2'=U' (FIG. 16). Per the assumption that the wheel speed, U', is the same at the inlet and exit of the cascade of rotating blades, the velocity triangles of FIGS. 14 and 15 can be overlaid (FIG. 16) to compare the velocities. The magnitudes of the inlet absolute velocity vector, V1' and the exit relative velocity vector, W2' are substantially different. The magnitude of the inlet absolute velocity vector, V1' is substantially larger than the exit relative velocity vector, W2'. These velocity differences are typical of a turbine with reaction substantially lower than 50%. A 50% reaction turbine has the shape of the turbine stage blade inlet velocity triangle and the shape of the turbine stage blade exit velocity triangle as substantially minor images about the central longitudinal engine axis A. The corresponding flow relative velocity, W2, and the absolute velocity, V1, are similar in speed measured in feet/sec or meters/sec. The corresponding flow relative velocity, W1, and the absolute velocity, V2, are similar in speed measured in feet/sec or meters/sec.

The reaction, R, is defined as ratio of the energy extracted by the turbine by the change of static pressure of the core flow gases (numerator) to the total energy extracted (denominator) as the summed change of static pressure of the core flow gases plus the change of the dynamic pressure of the core flow gases. Larger changes in static pressure increase flow Mach numbers and increase aerodynamic losses in the turbine. The independently controllable wheel 110 increases the change in dynamic pressure of the core flow gases and increases the change in kinetic energy of the core flow gases corresponding with the square of the absolute velocity, V2', versus the square of the absolute velocity, V1', and reduces the change of static pressure of the core flow gases within the flow channel of the rotating cascade of blades 124. This reduces the numerator faster than the denominator and allows the reaction, R, to be less than 50% for a substantially similar extraction of energy from the core flow gases. Reducing the change of static pressure of the core flow gases results in a lower the exit relative velocity vector, W2', relative to a conventional turbine and a lower exit relative velocity vector, W2', versus the absolute velocity V1'.

The corresponding flow Mach numbers, Mv1' and Mw2' of the respective velocity vectors, V1' and W2' are different. The Mach number, Mw2' is substantially lower than the Mach number Mw2 of a conventional turbine. The lower-level Mach number decreases the aerodynamic pressure losses within the core flow combustion gases and increases the thermodynamic efficiency of the turbine section 28. The size of the triangles as a measure of the speed of the core flow combustion gases exiting the cascade of stationary vanes and passing through the cascade of rotating blades is an attribute caused by the wheel speed, U'. The slower wheel speed, U', enables smaller Mw2' than the Mach number Mw2 of a conventional turbine. Slower U', alone, decreases the work output of the turbine section 28, however, augmenting V1 to V1' by swirling the inlet flow to the turbine rotor 126 to approach ever closer to the same direction as the direction of rotation of the cascade of rotating blades rotating with wheel speed U' increases the work output of the turbine section 28.

Comparing FIG. 15 to FIG. 5 illustrates that the independently controllable wheel 110 generates the exit relative velocity vector, W2' as being substantially smaller than the exit relative velocity vector, W2. The corresponding flow Mach numbers, Mw2' and Mw2 of the respective velocity vectors, W2' and W2 are different. The Mach number, Mw2' is substantially lower than the Mach number Mw2 of a conventional turbine. The lower-level Mach number decreases the aerodynamic pressure losses within the core flow combustion gases and increases the thermodynamic efficiency of the turbine.

Figure 17:
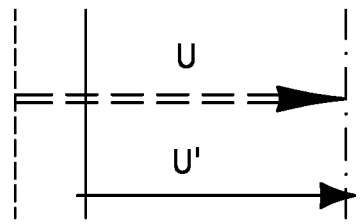
FIG. 17 is a schematic illustration of a comparison of turbine blade wheel speeds.

FIG. 17 overlays the wheel speeds of the cascade of rotating blades for the conventional turbine (FIG. 3) and the turbine with the independently controllable wheel 110. The wheel speed U' of the rotating cascades of the turbine as augmented by the independently controllable wheel 110 is substantially slower than the wheel speed U of the rotating cascades of the conventional turbine.

The free wheel enables a lower static pressure and lower static temperature, Ts1', of the core flow gases prior to entering the turbine blades 124. The free wheel enables a lower static temperature, Ts1', and lower relative total temperature, Ttre1, of the core flow gases, after the core flow gases enter the turbine blades 124. Ttre1 is the total temperature of the core flow gases within the relative frame of reference of the rotating cascade of turbine blades 124 and is the core flow gas temperature as seen by the turbine blades for cooling purposes.

With reference to FIG. 17, and assuming U' is about 90% of U, the independently controllable wheel 110 reduces relative total temperatures, Ttre1 as follows:

Augmented Rotating Cascade: $Tt\,re1 = 81\% [U1^2/(2gcJ)] + Ts1'$

For simplicity, when V1 and V1' are the same, Ts1 and Ts1' are substantially the same and the Ttre1 of the augmented cascade of rotating blades is lower due to the slower wheel speed U1' versus U1. The slower wheel speed, U1', and lower Ttre1 reduce the stress of the rotating blade cascade and enable less cooling flow for the turbine blades 124.

Figure 18:
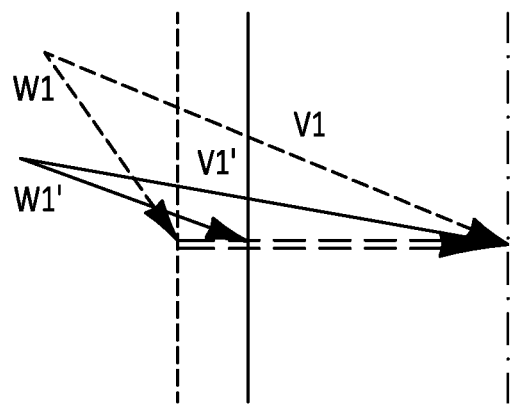
FIG. 18 is a schematic illustration of a comparison of turbine blade inlet velocity triangles.

FIG. 18 overlays the inlet velocity triangles for the conventional turbine and the turbine with the independently controllable wheel 110. The inlet relative velocities, W1 and W1' are similar in magnitude. The relative total temperatures, Ttre1, of the cascade of rotating blades for a conventional turbine and turbine augmented by the independently controllable wheel 110 are calculated as follows:

Conventional Rotating Cascade: $Tt\,re1 = U1^2/(2gcJ) + Ts1$

Augmented Rotating Cascade: $Tt\,re1' = U1'^2/(2gcJ) + Ts1'$

Where Ts1 and Ts1' are the static temperatures corresponding to the velocities, V1 and V1', respectively The free wheel enables a lower static temperature, Ts1', and lower wheel speed, U1', and results in a lower relative total temperature, Ttre1', of the core flow gases, after the core flow gases enter the flow channel of the rotating cascade of turbine blades 124.

Figure 19:
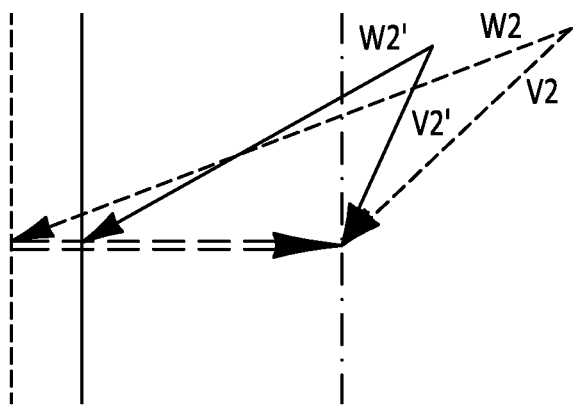
FIG. 19 is a schematic illustration of a comparison of turbine blade exit velocity triangles.

FIG. 19 overlays the exit velocity triangles for the conventional turbine and the turbine with the independently controllable wheel 110. The relative velocity W2' is substantially lower than the relative velocity W2 of a conventional turbine. The Mach number, Mw2' is substantially lower than the Mach number Mw2 of a conventional turbine. The size of the exit velocity triangles as a measure of the speed of the core flow combustion gases exiting the cascade of rotating blades is an attribute caused by the size of the wheel speed, U', of the cascade of rotating blades versus U such that "Z" is definable as the ratio of the exit relative velocity to the wheel speed as follows:

$Z = U/W2$ $Z' = U'/W2'$

From FIG. 19, it can be deduced that Z and Z' can be substantially the same. The work output of the turbine per mass flowrate is dh. The following relationship represents the independently controllable wheel 110 that can augment and improve the efficiency of a conventional turbine by reducing reaction and wheel speed while achieving substantially the same work output.

$$dh = 1/2 \frac{U^2}{Z} \underbrace{\left[1 - \left(\frac{W1}{W2}\right)^2\right]}_{\text{Reaction}}$$

$$dh' = 1/2 \frac{U'^2}{Z'} \underbrace{\left[1 - \left(\frac{W1'}{W2'}\right)^2\right]}_{\text{Reaction'}}$$

Comparing FIG. 6 and FIG. 16 W1'/W2' is substantially the same as W1/W2. The independently controllable wheel 110 can augment the efficiency of the turbine by reducing reaction and wheel speed while achieving the same work output by adjusting Z', U', W1'/W2', and the speed of the independently controllable wheel 110, mu. The speed of the independently controllable wheel 110, mu, is controlled independently of the speed U' of the turbine rotor 126. The independently controllable wheel 110 can change the work output of the turbine while holding constant the wheel speed, U', of the turbine. In another embodiment, the independently controllable wheel 110 can load match the turbine to a load such as a generator by varying the wheel speed mu of the independently controllable wheel 110.

Figure 20:
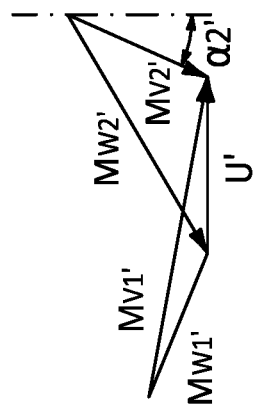
FIG. 20 is a schematic illustration of a conventional turbine stage overlay of blade inlet and exit velocity triangles shows ~50% reaction design.
Figure 21:
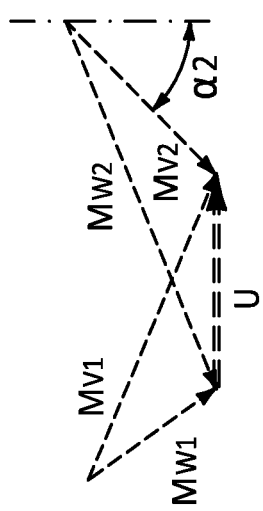
FIG. 21 is a schematic illustration of the independently controllable wheel turbine stage overlay of blade inlet and exit velocity triangles that shows a lower reaction design and lower Mach numbers for relative flow through the blade cascade, and reduced absolute exit swirl.
Figure 22:
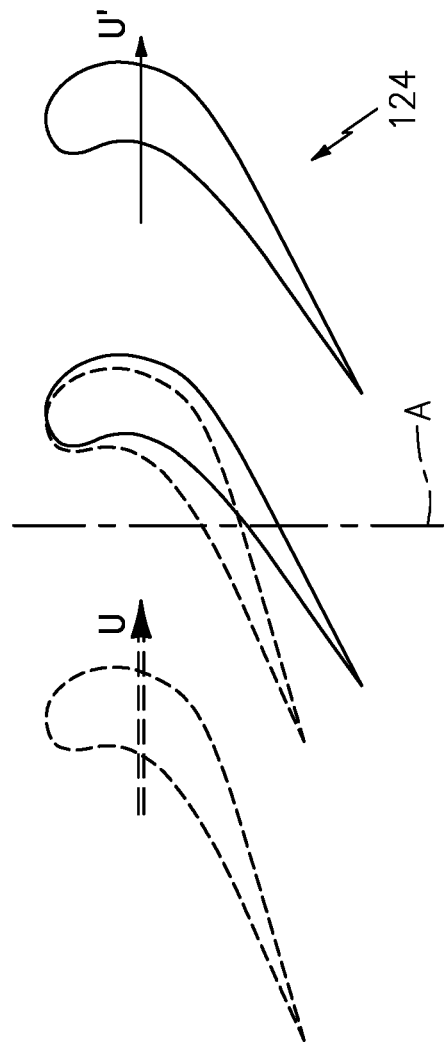
FIG. 22 is a schematic illustration of the independently controllable wheel turbine blading versus conventional turbine shows slower turbine wheel speed for reduced blade mechanical stress and reduction in blade relative temperature due to slower wheel speed.

With reference to FIGS. 20, 21, and 22 the independently controllable wheel 110 enables a smaller exit swirl angle for the absolute flow velocity exiting the rotating cascade of turbine blades 124. The swirl therein is measured with respect to the central longitudinal engine axis A. The direction of the absolute flow velocity exiting the rotating cascade of turbine blades is closer toward the substantially aft direction which improves the propulsive efficiency of the engine for the case of the turbine being the last stage of flow exiting the engine. The propulsive force of the core flow combustion gases is the vector component parallel to the central longitudinal engine axis A. Swirling flow exiting the engine does not produce as much thrust. FIG. 21. the independently controllable wheel 110 enables the engine to generate more thrust by directing the flow toward the same direction as parallel to the engine centerline axis of rotation. The cosine of the smaller angle alpha2' vectors the thrust from the core exit flow to push the aircraft forward substantially coincident with the aircraft flight vector.

With reference to FIG. 23, operationally, the speed of the independently controllable wheel 110 may be varied independently of the speed of the turbine rotor 126. The magnitude of the speed of the independently controllable wheel 110 can be set as a percentage of the independently controllable wheel 110 design speed and the magnitude of the speed of the turbine rotor 126 can be set as a percentage of the turbine rotor 126 design speed. The percentage of design speed of the free wheel 110 versus the percentage of the design speed of the turbine rotor 126 differ on a steady-state basis and as a transient basis depending on the power setting of the engine and demanded changes in engine power setting by the engine control (FADEC). For a steady state power setting of the engine 20, the speed of the free wheel 110 is scheduled as a function of the speed of the turbine rotor 126 and the speed of the turbine rotor is a function of the engine 20 steady state power setting. For a transient changes in power setting of the engine 20, the speed of the free wheel 110 is scheduled as a function of the speed of the turbine rotor 126 and the rate of change of the speed of the turbine rotor 126. The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed:

1. A turbine section for a gas turbine engine, comprising:
a first static vane structure; and
an independently controllable wheel downstream of the first static vane structure, the independently controllable wheel is driven by an electric motor, the electric motor comprises a stator assembly and a rotor assembly that comprises a multiple of rotor blades of the independently controllable wheel, wherein each of the multiple of rotor blades of the independently controllable wheel are thinner in thickness versus chord ratio as compared to each of a multiple of rotor blades of a turbine rotor assembly within the turbine section; downstream of the independently controllable wheel.

2. The turbine section as recited in claim 1, wherein the first static vane structure comprises a row of Nozzle Guide Vanes.

3. The turbine section as recited in claim 1, wherein the multiple of wheel rotor blades are uncooled.

4. The turbine section as recited in claim 1, wherein the multiple of wheel rotor blades are manufactured of a ceramic material.

5. The turbine section as recited in claim 1, wherein the multiple of wheel rotor blades rotate in the same direction as a multiple of rotor blades of the turbine rotor assembly.

6. The turbine section as recited in claim 1, wherein the multiple of wheel rotor blades increase a swirl prior to the turbine rotor assembly.

7. The turbine section as recited in claim 1, wherein the multiple of wheel rotor blades provide a pressure ratio lower than a compressor stage of the gas turbine engine.

8. The turbine section as recited in claim 1, further comprising a controller to selectively control the speed of the independently controllable wheel independent of the turbine rotor assembly.

9. The turbine section as recited in claim 1, wherein the independently controllable wheel is within the turbine section.

10. A turbine section for a gas turbine engine, comprising:
a first static vane structure;
an independently controllable wheel downstream of a combustor and the first static vane structure, the independently controllable wheel driven by an electric motor, the electric motor comprises a stator assembly and a rotor assembly with a multiple of rotor blades, wherein the multiple of rotor blades of the independently controllable wheel provide a pressure ratio of 1.01-1.02; and
a turbine rotor within the turbine section downstream of the independently controllable wheel.

11. A method of generating thrust for a gas turbine engine, comprising:
independently rotating an independently controllable wheel located downstream of a row of Nozzle Guide Vanes downstream of a combustor and upstream of a turbine rotor for augmenting a swirl of core flow combustion gases from the row of Nozzle Guide Vanes, wherein independently rotating the independently controllable wheel comprises electromechanically driving the independently controllable wheel independent of the turbine rotor.

12. The method as recited in claim 11, wherein augmenting the swirl comprises augmenting the swirl angular direction relative to a centerline of the engine to angle the core flow combustion gases closer to the direction of rotation of the turbine rotor.

13. The method as recited in claim 11, wherein rotating the independently controllable wheel comprises driving the independently controllable wheel independent of the turbine rotor to load match a turbine to a generator load by varying the wheel speed of the independently controllable wheel.

14. A gas turbine engine, comprising:
a combustor;
a first stage turbine rotor;
a row of Nozzle Guide Vanes downstream of the combustor and upstream of the first stage turbine rotor;
an independently controllable wheel downstream of the row of Nozzle Guide Vanes and upstream of the first stage turbine rotor, the wheel comprising a multiple of independently controllable wheel rotor blades; and
an electric motor to electromechanically drive the independently controllable wheel independent of the turbine rotor.

15. The gas turbine engine as recited in claim 14, wherein the multiple of independently controllable wheel rotor blades provides a pressure ratio lower than a compressor stage of the gas turbine engine.

16. The gas turbine engine as recited in claim 14, wherein the electric motor comprises a stator assembly and a rotor assembly that comprises the multiple of independently controllable wheel rotor blades.

* * * * *